United States Patent [19]

Molnar et al.

[11] Patent Number: 5,402,826
[45] Date of Patent: Apr. 4, 1995

[54] COUPLING DEVICE

[75] Inventors: Julius J. Molnar, Amherst; Jack Penick, Westlake, both of Ohio

[73] Assignee: Nordson Corporation, Westlake, Ohio

[21] Appl. No.: 207,439

[22] Filed: Mar. 7, 1994

[51] Int. Cl.[6] .............................................. F16L 37/28
[52] U.S. Cl. .......................... 137/614.01; 137/614.05; 285/9.2
[58] Field of Search ................ 137/614.01, 614.05; 251/149.6, 149.7; 285/9.2

[56] References Cited

U.S. PATENT DOCUMENTS

| | | |
|---|---|---|
| 1,844,099 | 2/1932 | Meier .................................. 285/9.2 |
| 3,315,899 | 4/1967 | Quarve . |
| 3,895,748 | 7/1975 | Klingenberg . |
| 3,999,691 | 12/1976 | Doom . |
| 4,004,717 | 1/1977 | Wanke . |
| 4,053,012 | 10/1977 | Farmer . |
| 4,124,163 | 11/1978 | Siegmann . |
| 4,142,707 | 3/1979 | Bjorklund . |
| 4,313,475 | 2/1982 | Wiggins . |
| 4,378,028 | 3/1983 | Weber et al. ................... 137/614.05 |
| 4,660,598 | 4/1987 | Butterfield et al. . |
| 5,078,168 | 1/1992 | Konieczynski . |
| 5,088,519 | 2/1992 | Giroux et al. ................... 137/614.01 |

*Primary Examiner*—A. Michael Chambers

[57] ABSTRACT

A coupling device comprises a male coupling member and a female coupling member, each having outwardly extending ends which carry male and female sealing elements, respectively, formed with mating, spherical-shaped surfaces which are effective to force solvent or coating material which may have collected thereon into passageways formed in each of such sealing elements or onto facing surfaces of the coupling members to substantially prevent contamination of new coating material flowing through the coupling device after a cleaning and/or color change operation has been performed.

25 Claims, 2 Drawing Sheets

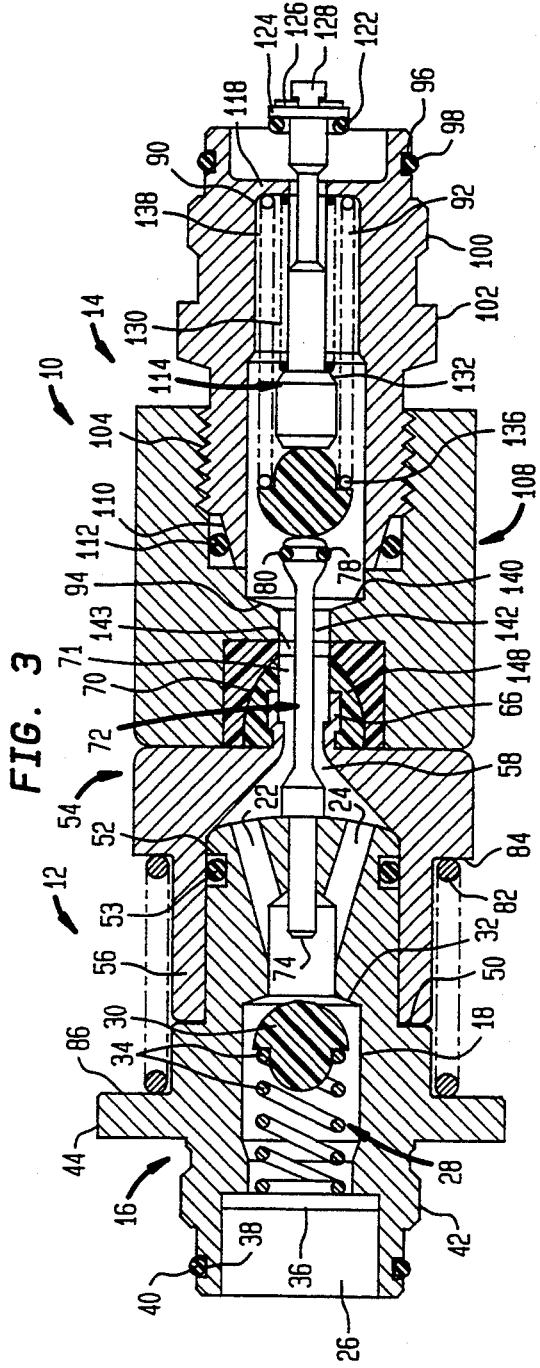
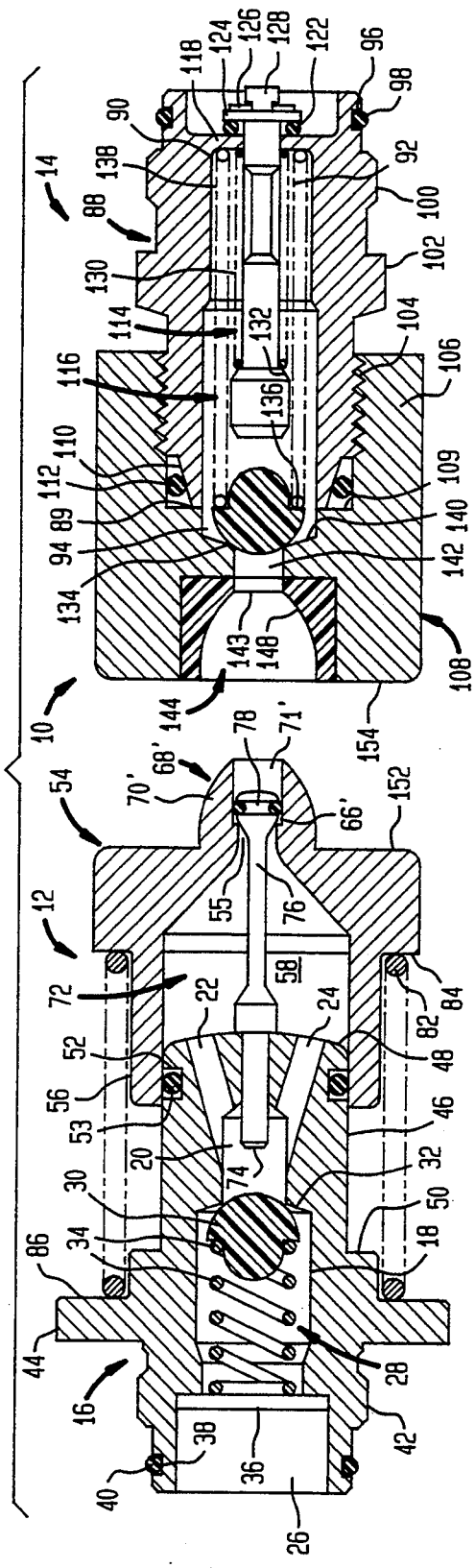

COUPLING DEVICE

FIELD OF THE INVENTION

This invention relates to coupling devices, and, more particularly, to a coupling device particularly intended for use in systems for spraying electrically conductive coating materials which substantially prevents leakage of the coating material, and which prevents contamination of new coating material flowing through the coupling device after a cleaning or a color change operation has been performed.

BACKGROUND OF THE INVENTION

Coupling devices are utilized in many applications for making and breaking connections in lines or flow paths which transmit-flowable materials. It has been found that one application where coupling devices are particularly useful is in systems for dispensing electrically conductive coating materials, such as water-based paints. In systems of this type, a "voltage block" or air gap must be maintained between the source of electrically conductive material and the electrostatically charged dispensing devices which discharge the coating material onto a substrate. Without this voltage block, personnel operating the equipment can be exposed to serious electrical shock if they were to come into contact with a charged supply of coating material, or, alternatively, if the supply is grounded, the electrostatics associated with the dispensing devices will not function.

Voltage block systems for dispensing electrically conductive coating material which employ coupling devices are shown, for example, in U.S. Pat. Nos. 4,313,475 and 5,078,168, both owned by the assignee of this invention, and the disclosures of which are incorporated by reference in their entireties herein. In these systems, electrically conductive coating material is first transmitted from a supply to a first vessel or a first pump which are electrically isolated from one or more dispensing devices. When filled with coating material, the first vessel or first pump is disconnected from the supply and then connected to a second vessel or a second pump, which, in turn, is connected to the dispenser(s). After the second tank or second pump is filled with coating material from the first vessel or first pump, the connection therebetween is broken allowing the second tank or second pump to supply coating material to the dispensers while the first vessel or first pump receives additional coating material from the source.

Coupling devices are very important to systems of the type described above in order to effectively make and break the connections between the first and second pumps or tanks, and the coating supply. It has been found that the coupling devices employed in U.S. Pat. No. 4,313,475, for example, are susceptible to leakage and/or drippage, and thus present clean-up problems. In addition, leakage of such connections can result in grounding of the system in which case the electrostatic coating dispensers cannot function. Further, such drippage can create an electrical shock hazard should a stream of dripping coating material contact an ungrounded object which is then touched by an operator.

The problem of drippage or leakage between mating elements of coupling devices employed in voltage block systems of the type described above has been addressed in U.S. Pat. No. 5,078,168 owned by the assignee of this invention. The '168 patent discloses a coupling device having mating male and female coupling elements which engage one another with a three-part seal to avoid leakage. The female coupling element is effective to "snuff back" or draw a vacuum at the outer end thereof which pulls in excess coating material present at the outer portions of the male and female coupling elements when they are decoupled. This creation of a suction or negative pressure at the outer end of the female coupling element substantially prevents drippage of coating material onto the floor or the surrounding apparatus, thus avoiding time consuming clean up and the potential problems of grounding of the coating dispensers and/or creating an electrical shock hazard.

While an improvement over previous coupling devices, the coupler disclosed in the '168 patent is potentially susceptible to problems of contamination of the coating material flowing therethrough after a color change or a cleaning operation has been performed. As disclosed in the '168 patent, when a coating operation is completed with a coating material of one color, the voltage block system and coupling device are cleaned with water or ocher solvent material in preparation for dispensing a coating material of different color. This cleaning procedure is necessary because in the course of a coating operation the coating material can collect on portions of the system, including the male and female coupling elements. It has been found that the configuration of the outer ends of the male and female coupling elements of the coupling device disclosed in the '168 patent can result in the retention or pooling of coating material thereon even after a cleaning operation is performed. As a result, when the system is operated with a new coating material of different color, the previous coating material or cleaning solvent which was retained on the coupling elements can come into contact with the new coating material thus creating problems of contamination. Additionally, the seal between the coupling elements of the '168 patent relies, at least in part, on o-rings located on each of the coupling elements. These o-rings become covered with coating material which dries causing the o-rings, in some instances, to be pulled away from their seats upon engagement and disengagement of the coupling elements.

SUMMARY OF THE INVENTION

It is therefore among the objectives of this invention to provide a coupling device particularly adapted for use in systems for dispensing electrically conductive coating materials such as water-based paint, which substantially prevents drippage or leakage of coating material therefrom, which is easy to clean, and, which substantially prevents contamination of coating material of one color with coating material of another color after a color change and/or cleaning operation is performed.

These objectives are accomplished in a coupling device including a male coupling member and a female coupling member, each having outwardly extending ends which carry a male sealing element and a female sealing element, respectively. The female sealing element has a partially spherical-shaped seat which mates with a partially spherical-shaped outer surface of the male sealing element associated with the male coupling member. The mating, spherical-shaped surfaces of the male and female coupling members are effective to force solvent or coating material which may have collected on the surfaces thereof in a direction either away from or toward central passageways formed in each of such sealing elements through which the coating material flows when the male and female coupling members are engaged. This substantially prevents coating material from remaining on the mating surfaces of the male and female seating elements after a cleaning operation is performed so that the coating material cannot migrate along such surfaces and contaminate new coating material flowing through the coupling device after a cleaning operation is completed.

One important aspect of this invention is predicated upon the concept of creating a "zero cavity" seal between the mating portions of the male and female coupling elements when they engage one another. That is, the mating surfaces of the male and female sealing elements associated with the coupling members engage one another along substantially the entire surface area thereof so that in the course of their engagement any coating material remaining on such surfaces is "squeezed" or forced either in an outward direction, i.e. away from central throughbores formed therein which permit the passage of coating material between the coupling members, or in an inward direction toward such central throughbores. As noted above, this prevents solvent cleaning material, or coating material used in a previous coating operation, from leaking or migrating into the central throughbores of the sealing elements and contaminating new coating material passing therethrough. At least one of the sealing elements is formed of a semi-rigid material such as Delrin to create a positive seal therebetween. In the preferred embodiment, the male sealing element is formed of metal such as stainless steel, and the female sealing element is formed of Delrin.

The coupling device of this invention also includes structure capable of creating a negative pressure or suction in the area of the male and female sealing elements of the coupling members. In the course of disengagement of the male and female coupling members, a negative pressure is created within a suction cavity associated with the male coupling member which is effective to draw or pull excess coating material present on the surfaces of such sealing members into the suction cavity. This substantially prevents drippage of coating material from the coupling members thus avoiding time consuming clean up, and also eliminates potential problems of grounding of the coating dispensers and/or creation of an electrical shock hazard in systems of the type described above for applying electrically conductive coating material.

DESCRIPTION OF THE DRAWINGS

The structure, operation and advantages of the presently preferred embodiment of this invention will become further apparent upon consideration of the following description, taken in conjunction with the accompanying drawings, wherein

FIG. 3 is a view similar to FIGS. 1 and 2 except with the coupling members in a fully engaged position to permit the flow of coating material therethrough;

FIG. 4 is a cross-sectional view similar to FIG. 1 illustrating a modified embodiment of the male and female sealing elements.

DETAILED DESCRIPTION OF THE INVENTION

Figure 1:
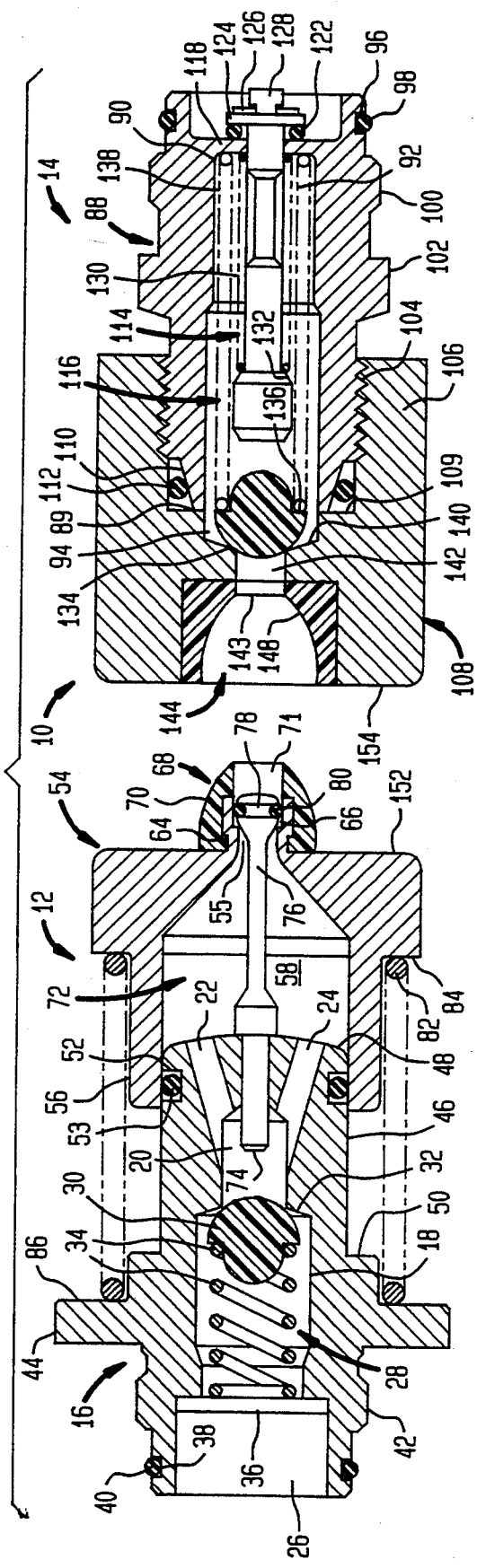
FIG. 1 is a cross-sectional view of the coupling device of this invention in a disengaged position.

Referring to the FIGS., the coupling device 10 of this invention comprises a male coupling member 12 and a female coupling member 14 which are movable relative to one another between a fully disengaged position depicted in FIG. 1 and a sealed, engaged position shown in FIG. 3. For purposes of the present discussion, each of the coupling members 12, 14 is described separately below, followed by an explanation of the operation of the coupling device 10.

Male Coupling Member

The male coupling member 12 comprises a coupler body 16 formed with a stepped throughbore 18 having an inlet 20 which intersects connector passages 22, 24, and an outlet 26. The throughbore 18 carries a one-way valve 28 having a ball or button 30 formed of a semi-rigid material such as Delrin or other suitable material. The button 30 of one-way valve 28 is movable with respect to a seat 32 formed in the coupler body 16 along the throughbore 18, and is normally maintained in a closed position against seat 32 by a spring 34 connected between the button 30 and a retaining ring 36 located at the outlet end 26 of throughbore 18.

The outer wall of the coupler body 16 of male coupling member 12 includes an outer end formed with a recess 38 which mounts an O-ring 40. The term "outer" as used herein is meant to refer to the lefthand side of male coupling member 12 as depicted in the Figs, whereas the term "inner" is meant to refer to the opposite side thereof. The outer wall of coupler body 16 is also formed with a threaded portion 42, located inwardly from the recess 38, which permits attachment of the male coupling member 12 to other structure as desired. Preferably, flats 44 are formed on the coupler body 16 to permit tightening of the threaded portion 42 of male coupling member 12 into such other structure (not shown).

The inward portion of the outer wall of coupler body 16 has a generally cylindrical-shaped sliding surface 46 which extends between the inward end 48 of coupler body 16 and a shoulder 50 formed in the outer wall of coupler body 16. A recess 52 extends radially inwardly from the sliding surface 46 at a point near the inward end 48, and this recess 52 mounts an O-ring 53.

The male coupling member 12 further includes a sleeve 54 having an inlet end 55 which tapers radially outwardly to a cylindrical-shaped, sliding portion 56 movable along the sliding surface 46 of coupler body 16. A suction cavity 58 is formed within the interior of sleeve 54 between the inward end 48 of coupler body 16 and the inlet end 55 of sleeve 54. As shown in the Figs., the sleeve 54 has an outwardly extending projection 64, located at its inlet end 55, which formed with an internal seat 66. The outer wall of projection 64 mounts a male sealing element 68 formed with a generally spherical-shaped outer surface 70 and a central bore 71 which communicates with the inlet end 55 of suction cavity 58. In the embodiment depicted in FIGS. 1–3, the male sealing element 68 is formed of a semi-rigid material such as Delrin. Alternatively, as shown in FIG. 4, the male sealing element 68' is formed in one piece from a rigid material, such as stainless steel, which extends outwardly from the face 152 of male coupling element 12. The one-piece male sealing element 68' has an outer, spherical-shaped surface 70', a central bore 71' and an internal seat 66'. All of the other elements of FIG. 4 are identical to those depicted in FIGS. 1-3, and are given the same reference numbers.

The coupler body 16 of male coupling member 12 mounts a valve actuator 72 having a stem section 74 threaded into the coupler body 16 between connector passages 22, 24, and a head section 76 which extends into the suction cavity 58. In the presently preferred embodiment, the head section 76 is formed with a circumferential recess 78 which mounts an O-ring 80 engageable with the internal wall of the projection 64 of sleeve 54. As described in detail below in connection with the discussion of the operation of coupling device 10, the valve actuator 72 is operative to open and close the coupling device 10 in response to engagement of the male and female coupling members 12, 14. The valve actuator 72 is mounted in a fixed position to the coupler body 16, while the sleeve 54 is slidable along the sliding surface 46 of coupler body 16. In the valve closed position, the sleeve 54 is held in the position depicted in FIG. 1 by a coil spring 82 extending between a shoulder or seat 84 formed at the inner end of sleeve 54 and a shoulder 86 formed in the outer wall of coupler body 16 immediately adjacent the flats 44. In this extended, closed position, the head section 76 of valve actuator 72 is located within the projection 64 of sleeve 54. When the sleeve 54 is moved outwardly along coupler body 16, i.e. from right to left as depicted in the Figs., the head section 76 of valve actuator 72 extends outwardly from the projection 64 in position to open the coupling device 10, as described below. See FIG. 3.

Female Coupling Member

The female coupling member 14 comprises a coupler body 88 including a throughbore 90 having an inlet 92 and outlet 94. The outer wall of coupler body 88 is formed with a recess 96 near the inlet 92 of throughbore 90 which receives an O-ring 98. Inwardly from the recess 96, the wall of coupler body 88 is formed with a threaded portion 100 and flats 102 which permit the coupler body 88 to be fixedly mounted to structure such as that associated with a coating material delivery system of the type disclosed in U.S. Pat. No. 5,078,168. The outer wall of coupler body 88 is also formed with a second threaded portion 104, located inwardly from the flats 102, which mounts the cylindrical section 106 of a collar 108 described in more detail below. Preferably, the innermost end of coupler body 88 is formed with a taper 110 which carries an O-ring 112 located between the collar 108 and coupler body 88. The coupler body 88 is threaded into the collar 108 so that the innermost edge 89 of coupler body 88 contacts a shoulder 109 formed in collar 108, thus creating a seal therebetween. O-ring 112 acts as a back-flow seal to block the flow of material along coupler body 88 which may leak from the seal created at edge 89 and shoulder 109.

The throughbore 90 of coupler body 88 carries a valve pin 114 and one-way valve 116 which are effective to control the flow of material into and through the throughbore 90 of coupler body 88. The valve pin 114 is normally maintained in a closed position against a seat 118 formed at the inlet 92 of throughbore 90. As depicted in FIG. 1, the outer end of valve pin 114 is formed with a recess which receives an O-ring 122. The O-ring 122 is retained in place by a washer 124, which, in turn, is connected to a retainer 126 located between the washer 124 and an end cap 128 of valve pin 114. The O-ring 122 is urged against the outer surface of seat 118 i.e. in a direction from right to left as depicted in FIG. 1, by a coil spring 130 which extends between a shoulder 132 formed at the inward end of valve pin 114 and the inner surface of seat 118.

The one-way valve 116 preferably comprises a ball or button 134 formed of a semi-rigid material such as Delrin or the like. The button 134 has an annular shoulder 136 which carries one end of a coil spring 138. The coil spring 138 is concentrically disposed about the valve pin 114 and extends from the button 134 to the seat 118 at the inlet end of throughbore 90. The button 134 Of One-Way valve 116 is urged by the coil spring 138 against a seat 140 formed at the entrance to a bore 142 in the collar 108. The bore 142 in collar 108 is connected to a central bore 143 formed in a female sealing element 144 mounted within a cylindrical-shaped seat at the inward end of collar 108. The female sealing element 144 has a substantially, spherical-shaped inner surface 148 which is shaped to mate with the outer surface 70 of the male sealing member 68. Preferably, the female sealing element 144 is formed of Delrin or other suitable semi-rigid material which exhibits at least some "give" or deformability upon contact with the male sealing elements 68 of 68' to better conform to the shape thereof and thus enhance the seal therebetween.

Operation of Coupling Device

Figure 2:
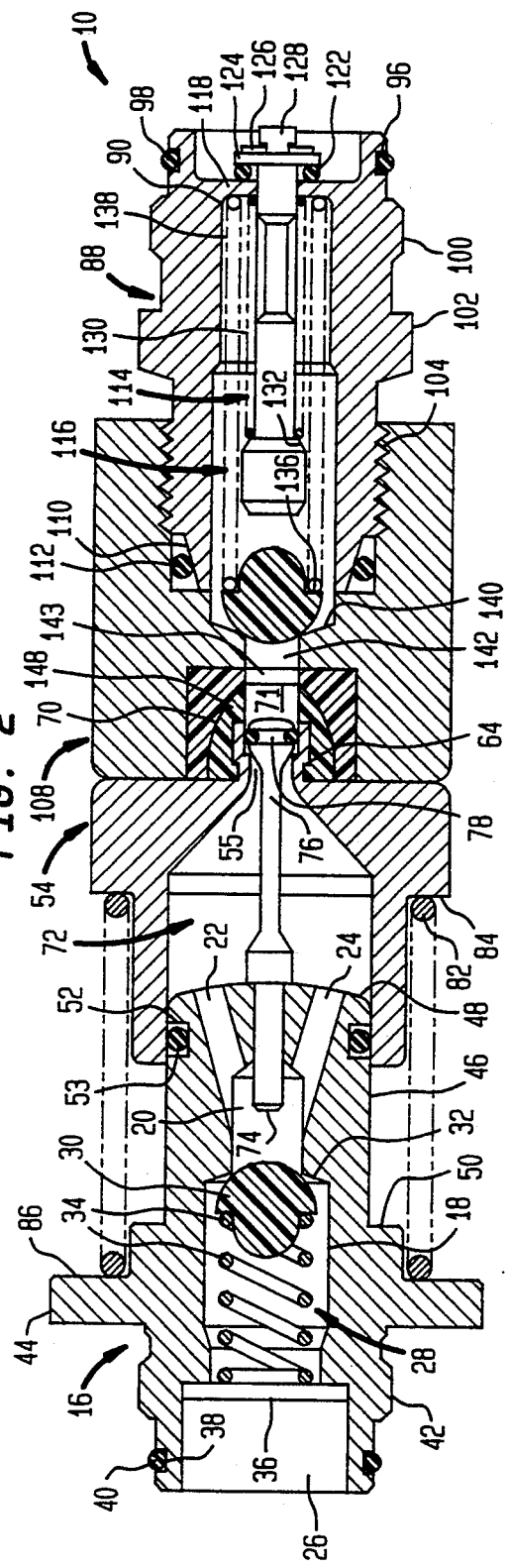
FIG. 2 is a view similar to FIG. 1 except with the male and female coupling members initially engaged with one another.

The operation of the coupling device 10 depicted in FIGS. 1-3 is described herein, it being understood that the coupling device of FIG. 4 is functionally identical. With reference initially to FIG. 1, the male and female coupling members, 12, 14 are separated from one another and both are in the closed position. The spring 34 of one-way valve 28 urges its associated button 30 to a closed position against the seat 32 within the male coupling member 12. The sleeve 54 of male coupling member 12 is in a fully extended position wherein its sliding portion 56 is located at the inward end 48 of sliding surface 46 of coupler body 16 with a seal created therebetween by the O-ring 53. In this fully extended position of sleeve 54, the volume of suction cavity 58 between its inlet end 55 and the inward end 48 of coupler body 16 is maximum, and the valve actuator 72 extends through the suction cavity 58 so that its head section 76 is in a sealed position along the interior wall of the projection 64 of sleeve 54.

The closed position of the female coupling member 14 is shown with the button 134 of one way valve 116 urged against the seat 140 of collar 108 by coil spring 138. The valve pin 114 is also in a closed position by operation of coil spring 130, wherein the O-ring 122 at the outer end of valve pin 114 is urged against the seat 118 within the throughbore 90 of female coupler body 88.

One important aspect of this invention involves the configuration of the male and female sealing elements 68, 144 of the male and female coupling members 12, 14, respectively. Coating material or solvent can accumulate on the surfaces 71, 148 of these sealing elements 68, 144 during a coating dispensing operation, described below, and/or in the course of a cleaning operation of the coupling device 10 when changing from a coating material of one color to a coating material of another color. In order to prevent contamination of new coating material flowing through the coupling device 10 with either "old" coating material from a previous operating run, or with a solvent such as water from a cleaning operation, the outer surface 70 of male sealing element 68 and the inner surface 148 of female sealing element 144 are substantially spherical in shape forming a ball-and-socket type connection upon engagement, as depicted in FIG. 2. As a result, any coating material or solvent which may have been present is forced or squeezed off of these surfaces 70, 148 in a direction either outwardly or inwardly relative to the central bore 71 of male sealing element 68 and the inlet 55 to suction chamber 58, and, relative to the central bore 143 of female sealing element 144 and the bore 142 in collar 108 leading into the female coupler body 14. That is, the coating material on the sealing element surfaces 70, 148 is forced out onto the facing surfaces 150, 152 of the male and female coupling members 12, 14, respectively, or into the central bore 71 and bores 142, 143. As noted above, the intention is to prevent migration of coating material from the sealing elements 68, 144 after a cleaning operation is performed so that new coating material is not contaminated. The coating material forced onto the facing surfaces 150, 152 of the coupling members 12, 14 is exposed to air and quickly dries, thus preventing its migration into bores 71, 142 and 143. This dried coating material can be readily cleaned from the coupling members 12, 14 by a rag or the like at the end of an operating shift. The coating material from surfaces 70, 148 of male and female sealing elements 68, 144 which is forced into bores 71, 142 and 143 is carried away by the solvent used in the cleaning operation.

In addition to their prevention of coating material contamination, the male and female sealing elements 68, 144 create essentially a "zero-cavity" connection when engaged, i.e. there are substantially no open areas therebetween. As such, an essentially continuous, uninterrupted passageway is formed from the central bore 143 of female sealing element 144 to and through the central bore 71 of male sealing element 68. Further, because at least one of the sealing elements 68, 144 is formed of a semi-rigid material such as Delrin, the sealing elements 68, 144 tend to conform to one another upon engagement to enhance the seal therebetween.

In order to open the coupling device 10, the male and female coupling members 12, 14 are moved toward one another from the position depicted in FIG. 2 to that shown in FIG. 3. After the male and female sealing elements 68, 144 engage one another, the male and female coupling members 12, 14 continue to move relative to one another thus causing the sleeve 54 of male coupling member 12 to move in an "outward" direction, or right to left as depicted in the Figs. The sliding portion 56 of sleeve 54 moves along the sliding surface 46 of coupler body 16 against the force of coil spring 82 causing the suction cavity 58 to reduce in volume and the valve actuator 72 to extend outwardly from the projection 64 of the sleeve 54. The valve actuator 72 enters the throughbore 142 within collar 108 and engages the button 134 of one way valve 116. Continued relative movement between the valve actuator 72 and the female coupling member 14 unseats the button 134 from its seat 140, against the force of coil spring 138, and forces the button 134 in a left-to-right direction as viewed in the Figs. The button 134 then engages the valve pin 114, and the button 134 and valve pin 114 thereafter move outwardly as a unit to a sufficient distance to unseat the O-ring 122 of valve pin 114 from the seat 118 within the throughbore 90 of coupler body 88.

As depicted in FIG. 3, a flow path is therefore formed past the unseated valve pin 114 and one-way valve 116 of female coupling member 14 into the central bore 143 of female sealing element 144. Because the valve actuator 72 extends outwardly from the projection 64 of sleeve 54, a flow path for the coating material is formed between the male and female sealing elements 68, 144 into the suction cavity 58 associated with male coupling member 12. The coating material flows through the suction cavity 58 into connector passages 22, 24 and then into the throughbore 18 of male coupler body 16. The pressure of the coating material is sufficient to unseat the button 30 of one-way valve 28 within throughbore 18, thus allowing a flow of coating material through the outlet end 26 of throughbore 18.

Another important aspect of this invention involves creating a suction within the suction cavity 58 to avoid drippage or loss of coating material in the area of the male and female sealing elements 68, 144 when they are disengaged. This suction is created by movement of the sleeve 54 relative to the coupler body 16 of male coupling member 12 when the male and female coupling members 12, 14 are disengaged to stop the flow of coating material therebetween. As viewed in FIG. 2, with the male and female coupling members, 12, 14 initially contacting one another, the volume of suction cavity 58 within the interior of sleeve 54 is maximum. This is because the coil spring 82 retains the sleeve 54 near the innermost end of the male coupler body 16. As noted above, in the course of movement of the male and female coupling members 12, 14 toward one another, the coil spring 82 is compressed and the inner portion of sleeve 54 is moved comparatively close to the inward end 48 of coupler body 16. The volume or size of the suction cavity 58 is thus at a minimum when the male and female coupling members 12, 14 are fully engaged as depicted in FIG. 3.

Upon disengagement of the male and female coupling members 12, 14, the coil spring 82 forces the sleeve 54 away from the inward end 48 of coupler body 16 thus increasing the volume of suction cavity 58 and creating a negative pressure or suction therein. The valve actuator 72 disengages the button 134 of one-way valve 116, permitting the valve pin 114 and one-way valve 116 of female coupling member 14 to seat by operation of their respective springs 130, 138. The o-ring 122 of valve pin 114 seats first against its seat 118, and then continued relative movement between the valve actuator 72 and female coupling member 14 allows the button 134 of one-way valve 116 to seat against the seat 140 of collar 108. When the valve pin 114 is seated, the spring 34 of the one-way valve 28 associated with male coupling element 12 forces button 30 against its seat 32 thus preventing back flow of coating material through the throughbore of coupling member 12. With the flow along throughbore 18 of male coupling member 12 blocked by one-way valve 28, and the flow within throughbore 90 of female coupling member 14 blocked by valve pin 114 and one-way valve 116, the male and female coupling members 12, 14 continue to move apart and the negative pressure created within suction cavity 58 is effective to draw coating material from the outer areas of male and female coupling members 12, 14, into the suction cavity 58, i.e. those areas surrounding the male and female sealing members 68, 144, including their mating surfaces 70, 148. This substantially reduces or prevents drippage of coating material from these areas which might otherwise fall away from the coupling device 10.

While the invention has been described with reference to a preferred embodiment, it should be understood by those skilled in the art that various changes may be made and equivalence may be substituted for elements thereof without departing from the scope of the invention. In addition, many modifications may be made to adapt a particular situation or material to the teachings of the invention without department from the essential scope thereof. Therefore, it is intended that the invention not be limited to the particular embodiment disclosed as the best mode contemplated for carrying out this invention, but that the invention will include all the embodiments falling within the scope of the appended claims.

We claim:

1. A coupling device particularly adapted for use in systems for dispensing electrically conductive coating materials wherein a voltage block is employed to electrically isolate a source of the coating material from one or more electrostatic coating dispensers, said coupling device comprising:

a first coupling member formed with a first passageway having an inlet end adapted to connect to a source of flowable material and an outlet end;

a second coupling member including a second passageway having an inlet and an outlet;

a first sealing element and a mating, second sealing element each mounted to one of said first and second coupling members, said first and second sealing elements being movable into sealing engagement with one another upon engagement of said first and second coupling members to form a throughbore through said first and second sealing elements which to permits the passage of flowable material from said first passageway of said first coupling member, through said throughbore and into said second passageway of said second coupling member one of said first and second sealing elements being formed with a seat and the other of said first and second sealing elements being formed with an outer wall which contacts substantially the entire surface area of said seat upon engagement thereof so that flowable material which may collect on said seat and/or said outer wall is removed therefrom, said coating material being forced by said engagement of said seat and said outer wall either in a direction away from said throughbore or into said throughbore.

2. The coupling device of claim 1 in which at least one of said first and second sealing elements is formed of a semi-rigid material.

3. The coupling device of claim 2 in which each of said first and second sealing elements is formed of a semi-rigid material.

4. The coupling device of claim 2 in which said first sealing element is formed of semi-rigid material and said second sealing element is formed of metal so that upon engagement thereof said first sealing element substantially conforms to the shape of said second sealing element.

5. The coupling device of claim 1 in which said first coupling member includes a one-way valve carried within said passageway, said one-way valve being movable between open and closed positions.

6. The coupling device of claim 5 in which said second coupling member includes means for moving said one-way valve of said first coupling member to said open position.

7. The coupling device of claim 1 in which said seat and said outer wall are formed with mating, substantially spherical shapes.

8. A coupling device comprising:

a first coupling member formed with a first passageway having an inlet end adapted to connect to a source of flowable material and an outlet end, said passageway carrying a one-way valve movable between open and closed positions;

a second coupling member including a second passageway having an inlet and means for moving said one-way valve of said first coupling member to said open position upon engagement of said first and second coupling members to permit the passage of flowable material from said first passageway of said first coupling member into said second passageway of said second coupling member;

said first and second coupling members having facing surfaces which contact one another upon engagement of said coupling members;

a first sealing element and a mating, second sealing element each formed with a throughbore and each being mounted to one of said first and second coupling members, said first and second sealing elements being movable into sealing engagement with one another upon engagement of said first and second coupling members to permit the passage of flowable material from said first passageway of said first coupling member, between said throughbores of said first and second sealing elements and into said second passageway of said second coupling member;

one of said first and second sealing elements being formed with a seat and the other of said first and second sealing elements being formed with an outer wall which contacts substantially the entire surface area of said seat upon engagement thereof so that flowable material which may collect on said seat and/or said outer wall is removed therefrom, said coating material being forced by said engagement of said seat and said outer wall either in a direction away from said throughbore of said first sealing element and said throughbore of said second sealing element or into said throughbores of said first and second sealing elements.

9. The coupling device of claim 8 in which at least one of said first and second sealing elements is formed of a semi-rigid material.

10. The coupling device of claim 9 in which each of said first and second sealing elements is formed of a semi-rigid material.

11. The coupling device of claim 9 in which said first sealing element is formed of semi-rigid material and said second sealing element is formed of metal so that upon engagement thereof said first sealing element substantially conforms to the shape of said second sealing element.

12. The coupling device of claim 8 in which said first sealing element is formed with a central bore, said seat of said first sealing element being formed in a substantially spherical shape.

13. The coupling device of claim 12 in which said second sealing element is formed with a central bore alignable with said central bore of said first sealing element, said outer wall of said second sealing element being formed in a substantially spherical-shape which mates with substantially the entire surface area of said spherical-shaped seat of said first sealing element.

14. The coupling device of claim 8 in which said first coupling member comprises:
   a coupler body formed with said first passageway;
   a seat formed in said coupler body along said passageway, said one-way valve being movable relative to said seat;
   a valve pin carried within said passageway in position upstream from said one-way valve, said valve pin being movable between open and closed positions in response to engagement with said one-way valve.

15. The coupling device of claim 14 in which said one-way valve includes a button formed of semi-rigid material.

16. The coupling device of claim 18 in which said second coupling member comprises:
   a coupler body having a passageway formed with an inlet and an outlet;
   a sleeve member movable between a valve open position and a valve closed position relative to said coupler body, said sleeve member being formed with a suction cavity having an inlet communicating with said passageway of said coupler body;
   a one-way valve carried within said passageway of said coupler body and movable between open and closed positions relative to a seat located between said inlet and said outlet of said passageway;
   a valve actuator connected to said coupler body and extending into said suction cavity of said sleeve member, said valve actuator being effective to move said one-way valve of said first coupling member to an open position as said sleeve member is moved to said valve open position upon engagement of said first and second coupling elements.

17. The coupling device of claim 16 in which said one-way valve includes a ball element formed of semi-rigid material.

18. A coupling device, comprising:
   a female coupling member formed with a passageway having an inlet end adapted to connect to a source of flowable material and an outlet end, said passageway carrying a one-way valve movable between open and closed positions, said female coupling member mounting a female sealing element having a throughbore connected to said outlet end of said passageway, said female sealing element being formed with a substantially spherical-shaped seat;
   a male coupling member formed with a passageway having an inlet and an outlet, said male coupling member including:
      (i) means for moving said one-way valve of said female coupling member to said open position upon engagement of said male and female coupling members to permit the passage of flowable material therebetween;
      (ii) a male sealing element having a throughbore and being mounted to said male coupling member at said inlet to said passageway therein, said male sealing element being formed with a substantially spherical-shaped outer wall mateable with said spherical-shaped seat of said female sealing element;
   said male and female coupling members having facing surfaces which contact one another upon engagement of said coupling members, said male and female sealing elements being movable into sealing engagement with one another upon said engagement of said coupling members to permit the passage of flowable material from said passageway of said female coupling member, between said throughbores of said first and second sealing elements and into said passageway of said male coupling member, said mating spherical-shaped seat of said female sealing element engaging substantially the entire surface area of said spherical-shaped outer wall of said male sealing element to force flowable material which may collect thereon away from said seat and said outer wall, said coating material being forced either onto at least one of said facing surfaces of said coupling members or into said throughbores of said male and female sealing elements.

19. The coupling device of claim 18 in which at least one of said male and female sealing elements is formed of a semi-rigid material.

20. The coupling device of claim 19 in which each of said first and second sealing elements is formed of a semi-rigid material.

21. The coupling device of claim 19 in which said first sealing element is formed of semi-rigid material and said second sealing element is formed of metal.

22. The coupling device of claim 8 in which said female coupling member comprises:
   a coupler body formed with said passageway;
   a seat formed in said coupler body along said passageway, said one-way valve being movable relative to said seat;
   a valve pin carried within said passageway in position upstream from said one-way valve, said valve pin being movable between open and closed positions in response to engagement with said one-way valve.

23. The coupling device of claim 18 in which said one-way valve includes a button formed of semi-rigid material.

24. The coupling device of claim 17 in which said male coupling member comprises:
   a coupler body having a passageway formed with an inlet and an outlet;
   a sleeve member movable between a valve open position and a valve closed position relative to said coupler body, said sleeve member being formed with a suction cavity having an inlet communicating with said passageway of said coupler body;
   a one-way valve carried within said passageway of said coupler body and movable between open and closed positions relative to a seat located between said inlet and said outlet of said passageway;
   a valve actuator connected to said coupler body and extending into said suction cavity of said sleeve member, said valve actuator being effective to move said one-way valve of said female coupling member to an open position as said sleeve member is moved to said valve open position upon engagement of said female and male coupling elements.

25. The coupling device of claim 24 in which said one-way valve includes a ball element formed of semi-rigid material.

* * * * *